(12) United States Patent
Horie et al.

(10) Patent No.: US 11,143,420 B2
(45) Date of Patent: Oct. 12, 2021

(54) AIR-CONDITIONING APPARATUS

(71) Applicant: Mitsubishi Electric Corporation, Tokyo (JP)

(72) Inventors: Hayato Horie, Tokyo (JP); Mamoru Hamada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 210 days.

(21) Appl. No.: 16/333,338

(22) PCT Filed: Dec. 21, 2016

(86) PCT No.: PCT/JP2016/088124
§ 371 (c)(1),
(2) Date: Mar. 14, 2019

(87) PCT Pub. No.: WO2018/116410
PCT Pub. Date: Jun. 28, 2018

(65) Prior Publication Data
US 2019/0301752 A1    Oct. 3, 2019

(51) Int. Cl.
*F24F 11/875* (2018.01)
*F24F 1/14* (2011.01)
(Continued)

(52) U.S. Cl.
CPC ............... *F24F 1/14* (2013.01); *F24F 1/00* (2013.01); *F24F 11/46* (2018.01); *F24F 11/63* (2018.01);
(Continued)

(58) Field of Classification Search
CPC . F24F 11/875; F24F 11/84; F25B 1/08; F25B 7/00; F25B 2400/0409; F25B 2400/0403; B60H 1/00492; Y02E 60/14
See application file for complete search history.

(56) References Cited

U.S. PATENT DOCUMENTS 4,493,193 A * 1/1985 Fisher ............... F24D 11/0214
                                                                62/160
5,970,729 A   10/1999 Yamamoto et al.
(Continued)

FOREIGN PATENT DOCUMENTS

CN    101115961 A    1/2008
CN    105299996 A    2/2016
(Continued)

OTHER PUBLICATIONS

Extended European Search Report dated Dec. 2, 2019 issued in corresponding EP patent application No. 16924426.6.
(Continued)

*Primary Examiner* — Frantz F Jules
*Assistant Examiner* — Lionel Nouketcha
(74) *Attorney, Agent, or Firm* — Posz Law Group, PLC (57) ABSTRACT

An air-conditioning apparatus includes a refrigerant circuit and a fluid circuit. The fluid circuit includes a first branch circuit that connects a branching portion at which a downstream portion of a second heat exchanger branches and a connecting portion farther downstream in a direction of fluid flow than the branching portion, and a second branch circuit that connects a branching portion at which a portion farther downstream than the connecting portion of the first branch circuit branches and a connecting portion farther downstream in the direction of fluid flow than the branching portion of the second branch circuit. The first branch circuit is provided with a third heat exchanger that exchanges heat between fluid flowing through the fluid circuit and outdoor air, and the second branch circuit is provided with a heat storage tank that stores fluid having exchanged heat with outdoor air in the third heat exchanger.

11 Claims, 8 Drawing Sheets

(51) Int. Cl.
*F24F 11/63* (2018.01)
*F24F 11/84* (2018.01)
*F24F 11/46* (2018.01)
*F24F 1/00* (2019.01)
*F24F 11/00* (2018.01)

(52) U.S. Cl.
CPC ............ *F24F 11/84* (2018.01); *F24F 11/875* (2018.01); *F24F 2011/0006* (2013.01)

(56) References Cited

U.S. PATENT DOCUMENTS

| | | | |
|---|---|---|---|
| 7,874,171 B2* | 1/2011 | Park | H05K 7/20654 62/185 |
| 2009/0019874 A1 | 1/2009 | Park | |
| 2013/0098597 A1 | 4/2013 | Fujimoto et al. | |
| 2014/0260392 A1* | 9/2014 | Hawkins | F25B 29/00 62/238.6 |
| 2015/0204586 A1* | 7/2015 | Burg | F25B 41/20 62/324.6 |

FOREIGN PATENT DOCUMENTS

| | | |
|---|---|---|
| JP | 2008-215680 A | 9/2008 |
| JP | 2009-198089 A | 9/2009 |
| JP | 2013-092298 A | 5/2013 |
| JP | 2016-114310 A | 6/2016 |
| WO | 2006/112570 A1 | 10/2006 |

OTHER PUBLICATIONS

Office Action dated Jul. 22, 2020 issued in corresponding CN patent application No. 201680091485.7 (and English translation).
Office Action dated Jan. 18, 2021 issued in corresponding CN patent application No. 201680091485.7 (and English translation).

* cited by examiner

AIR-CONDITIONING APPARATUS

CROSS REFERENCE TO RELATED APPLICATION

This application is a U.S. national stage application of International Application No. PCT/JP2016/088124, filed on Dec. 21, 2016, the contents of which are incorporated herein by reference.

TECHNICAL FIELD

The present invention relates to an air-conditioning apparatus provided with an outdoor air air-conditioning function.

BACKGROUND ART

Air-conditioning apparatuses each provided with an outdoor air air-conditioning function exist. Among outdoor air air-conditioning functions, outdoor air cooling is a technology that performs cooling operation by mixing outdoor air with indoor air (return air) and introducing the mixed air indoors or introducing outdoor air indoors directly when the outdoor air temperature is equal to or lower than a fixed value.

As the conditions of performing outdoor air cooling are that the outdoor air temperature is low to a certain extent and also that there is a cooling demand as load, the period of using outdoor air cooling has been limited.

To solve the problem, technology that extends the period of using outdoor air cooling is being developed.

For example, as described in Patent Literature 1, technology is disclosed that "in the case in which the outdoor air temperature is equal to or lower than the return air temperature, cooling the outdoor air with an air-conditioning apparatus rather than cooling the return air with an air-conditioning apparatus can reduce the amount of input heat needed to obtain a predetermined supply air temperature, and thus by introducing outdoor air even in the case in which the outdoor air temperature is higher than the supply air temperature and using the air-conditioning apparatus to cool only enough to reach the supply air temperature, the temperature range within which outdoor air cooling is used may be widened, and in a single year, in seasons when the daily change in the outdoor air temperature crosses the return air temperature, longer cooling operation than that at present can be performed in the morning and after sunset with the same amount of input heat."

Also, as described in Patent Literature 2, technology is disclosed that "includes a heat storage water tank for storing cold water, an outdoor air wet-bulb thermometer, a cooling water circulation passage including a group of freezers, a cooling tower, and a pump, a cooling water circulation passage for free cooling including a cooling tower and a pump, a heat exchanger for exchanging heat between the cooling water in the cooling water circulation passage and the water in the heat storage water tank, a heat exchanger for exchanging heat between the cooling water in the cooling water circulation passage for free cooling and the water in the heat storage water tank, a cooling circuit for free cooling, including a cooling tower and a pump, and connected with a going-way of the cooling water circulation passage for free cooling to cool the cooling water of the cooling water circulation passage for free cooling, a switching mechanism disposed between the cooling water circulation passage for free cooling and the cooling circuit for free cooling, and connecting the cooling water circulation passage for free cooling and the cooling circuit for free cooling in series, and a control device for controlling the switching of the switching mechanism."

With the technology described in Patent Literature 1, it is possible to extend the period of outdoor air cooling and improve the energy efficiency of an air-conditioning apparatus year-round.

With the technology described in Patent Literature 2, it is possible to connect two cooling towers in series, thereby extending the free cooling time and reducing energy consumption.

PATENT LITERATURE

Patent Literature 1: Japanese Unexamined Patent Application Publication No. 2009-198089
Patent Literature 2: Japanese Unexamined Patent Application Publication No. 2008-215680

However, although the technology described in Patent Literature 1 is effective for an air-conditioning apparatus used in situations such as in a data center running 24 hours a day, the effect of lengthening the outdoor air cooling period is reduced in an air-conditioning apparatus used in an office or a residence not running 24 hours a day. In other words, in an air-conditioning apparatus used in an office or a residence, as the air-conditioning apparatus often is not running at times of day that satisfy the conditions that the outdoor air temperature is low to a certain extent and also that there is a cooling demand as load, the effect of lengthening the outdoor air cooling period is reduced compared to that of an air-conditioning apparatus running 24 hours a day.

Also, in the technology described in Patent Literature 2, two cooling towers for free cooling must be provided separately, leading to a bulkier device and increased expenses. Also, it is necessary to secure a large installation space in the building such as an office and a residence where the device is to be installed, which may lead to even greater expenses.

Furthermore, an air handling unit (hereinafter designated AHU) is able to introduce outdoor air, but air-conditioning apparatuses each having only an indoor unit unable to introduce outdoor air, like a fan coil unit (hereinafter designated FCU) also exist, and with an air-conditioning apparatus unable to introduce outdoor air, the outdoor air cooling cannot be performed.

SUMMARY

The present invention has been devised to solve the problems as shown above, and an objective of the present invention is to provide an air-conditioning apparatus that achieves a lengthening of the outdoor air air-conditioning period irrespectively of presence of operating time.

An air-conditioning apparatus according to an embodiment of the present invention includes a refrigerant circuit in which a compressor, a first heat exchanger, an expansion valve, and a second heat exchanger are connected by pipes, and through which refrigerant circulates, and a fluid circuit through which fluid circulates, the fluid exchanging heat, in the second heat exchanger, with the refrigerant circulating through the refrigerant circuit. The fluid circuit includes a first branch circuit that connects a branching portion at which a downstream portion of the second heat exchanger branches and a connecting portion farther downstream in a direction of fluid flow than the branching portion, and a second branch circuit that connects a branching portion at which a portion farther downstream than the connecting portion of the first branch circuit branches and a connecting portion farther downstream in the direction of fluid flow than the branching portion of the second branch circuit. The first branch circuit is provided with a third heat exchanger that exchanges heat between fluid flowing through the fluid circuit and outdoor air, and the second branch circuit is provided with a heat storage tank that stores fluid having exchanged heat with outdoor air in the third heat exchanger.

In the air-conditioning apparatus according to an embodiment of the present invention, the fluid having exchanged heat with outdoor air in the third is stored in the heat storage tank, and as air-conditioning operation utilizing the fluid stored in the heat storage tank is possible, it becomes possible to achieve a lengthening of the outdoor air air-conditioning period irrespectively of presence of the operating time.

DETAILED DESCRIPTION

Hereinafter, embodiments of the present invention will be described with reference to the drawings. Note that, in the drawings hereinafter, including FIG. 1, the relative sizes of components may differ from actual sizes in some cases. Also, in the drawings hereinafter, including FIG. 1, elements denoted with the same sign are the same or corresponding elements, and this note is common throughout the text of the specification. Furthermore, the form of the components expressed throughout the text of the specification is merely illustrative, and such a component is not limited to what is described.

Embodiment 1

Figure 1:
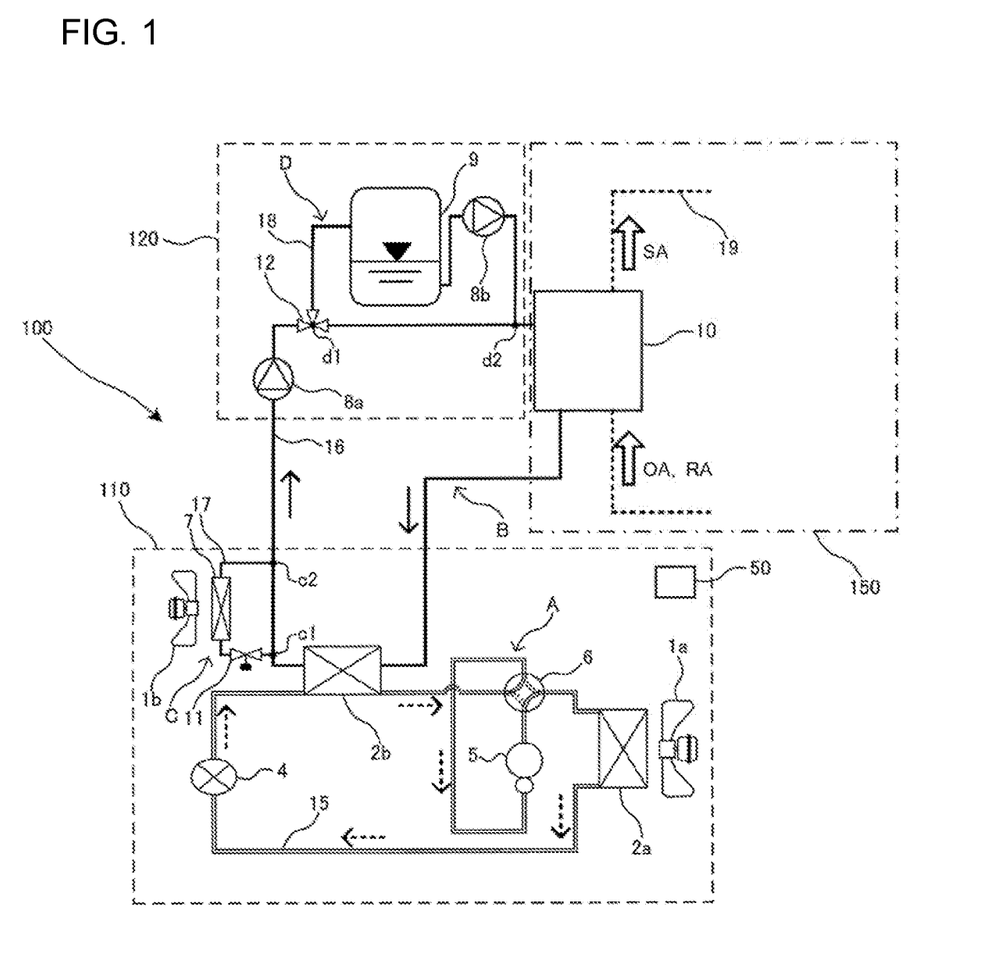
FIG. 1 is a schematic configuration diagram illustrating one example of a refrigerant circuit configuration of the air-conditioning apparatus according to Embodiment 1 of the present invention.
Figure 2:
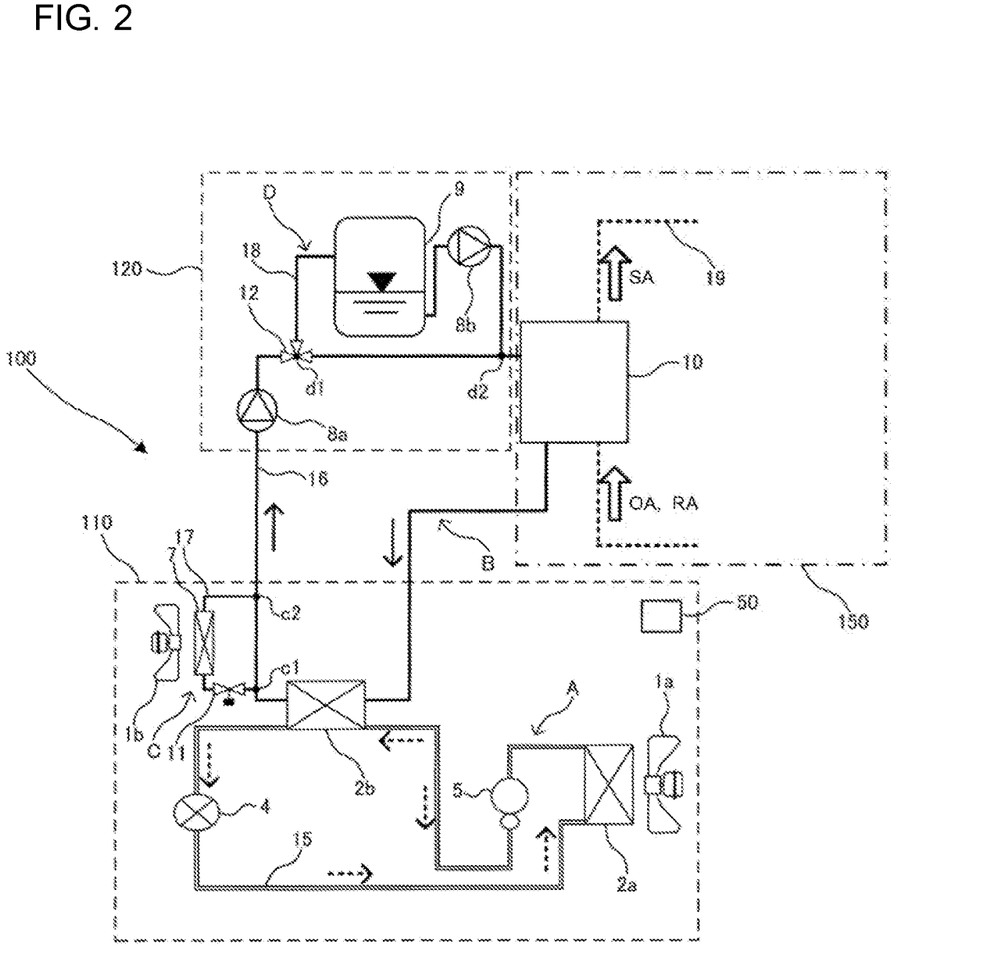
FIG. 2 is a schematic configuration diagram illustrating another example of a refrigerant circuit configuration of the air-conditioning apparatus according to Embodiment 1 of the present invention.

FIGS. 1 and 2 are schematic configuration diagrams each illustrating one example of the refrigerant circuit configuration of an air-conditioning apparatus 100 according to Embodiment 1 of the present invention. The air-conditioning apparatus 100 will be described with reference to FIGS. 1 and 2. Note that in FIGS. 1 and 2, the flow of refrigerant in the refrigerant circuit is denoted with dashed-line arrows, the flow of water in the fluid circuit is denoted with solid-line arrows, and the flow of air is denoted with outlined arrows. The flow of refrigerant illustrated herein illustrates as an example in a state in which a first heat exchanger 2a is caused to act as a condenser. Note that in the case of causing the first heat exchanger 2a to act as an evaporator, it is sufficient to control a flow switching device 6 to switch the flows of refrigerant. However, as illustrated in FIG. 2, the flow switching device 6 does not have to be installed, and the first heat exchanger 2a may be caused to act only as a condenser.

<Configuration of Air-Conditioning Apparatus 100>

The air-conditioning apparatus 100 is capable of performing a vapor compression refrigeration cycle operation, and is also provided with an outdoor air air-conditioning function. Outdoor air air-conditioning functions include outdoor air cooling and outdoor air heating. Outdoor air cooling refers to cooling operation performed by mixing outdoor air with return air and introducing the mixed air indoors or introducing outdoor air indoors directly when the outdoor air temperature is equal to or lower than a fixed value. Outdoor air heating refers to heating operation performed by mixing outdoor air with return air and introducing the mixed air indoors or introducing outdoor air indoors directly when the outdoor air temperature is equal to or greater than a fixed value.

The air-conditioning apparatus 100 includes a refrigerant circuit A and a fluid circuit B. Also, a first branch circuit C and a second branch circuit D are connected to the fluid circuit B.

(Refrigerant Circuit A)

The refrigerant circuit A is configured by connecting the refrigerant flow channels of a compressor 5, a flow switching device 6, a first heat exchanger 2a, an expansion device 4, and a second heat exchanger 2b by refrigerant pipes 15. By causing refrigerant to circulate through the refrigerant circuit A, vapor compression refrigeration cycle operation is caused to be performed in the air-conditioning apparatus 100.

The compressor 5 is utilized to transport refrigerant in the refrigerant circuit A. Specifically, the compressor 5 has a function of compressing refrigerant to be discharged as a high-temperature and high-pressure gas refrigerant. For example, the compressor 5 may be configured as an inverter compressor. When the compressor 5 is configured as an inverter compressor, the operating frequency (rotation frequency) of the compressor 5 may be adjusted by a compressor frequency adjustment unit (the control device 50 described hereinafter), thereby enabling the capacity (the amount of refrigerant discharged per unit time) of the compressor 5 to be controlled. For example, it is possible to adopt a type of compressor such as a rotary compressor, a scroll compressor, a screw compressor, and a reciprocating compressor as the compressor 5.

The flow switching device 6 switches the flows of refrigerant in a demanded operating state. In other words, the flow switching device 6 switches the flow channel to connect the compressor 5 and the first heat exchanger 2a during operation that causes the first heat exchanger 2a to act as a condenser, and the flow channel to connect the compressor 5 and the second heat exchanger 2b during operation that causes the first heat exchanger 2a to act as an evaporator.

Note that the flow switching device 6 is preferably configured as a four-way valve, for example. The flow switching device 6 may also use a combination of two-way values or three-way valves rather than a four-way valve. Also, as illustrated in FIG. 2, in the case in which refrigerant switching is not demanded, it is not necessary to provide the flow switching device 6.

The first heat exchanger 2a acts as a condenser or an evaporator, and acts as a refrigerant-air heat exchanger that exchanges heat between refrigerant flowing through the refrigerant circuit A and air supplied by a first fan 1a. In the case in which the first heat exchanger 2a acts as a condenser, in the first heat exchanger 2a, heat is exchanged between the high-temperature and high-pressure refrigerant discharged from the compressor 5 and the air supplied by the first fan 1a, causing the high-temperature and high-pressure gas refrigerant to condense. On the other hand, in the case in which the first heat exchanger 2a acts as an evaporator, in the first heat exchanger 2a, heat is exchanged between low-temperature and low-pressure refrigerant flowing out from the expansion device 4 and the air supplied by the first fan 1a, causing the low-temperature and low-pressure liquid refrigerant or two-phase refrigerant to evaporate.

The first heat exchanger 2a may be configured as a fin and tube heat exchanger, for example.

The driving of the first fan 1a is controlled to supply air to the first heat exchanger 2a.

The expansion device 4 causes refrigerant flowing out from the first heat exchanger 2a or the second heat exchanger 2b to expand and reduce in pressure. The expansion device 4 is preferably configured as a device capable of adjusting the flow rate of refrigerant, such as an electric expansion valve, for example. Also, rather than using an expansion valve for the expansion device 4, it is also possible to apply a device such as a capillary tube as the expansion device 4.

The second heat exchanger 2b acts as an evaporator or a condenser, and acts as a refrigerant-heat medium heat exchanger that exchanges heat between refrigerant flowing through the refrigerant circuit A and fluid flowing through the fluid circuit B. In the case in which the second heat exchanger 2b acts as an evaporator, in the second heat exchanger 2b, heat is exchanged between low-temperature and low-pressure refrigerant flowing out from the expansion device 4 and the fluid flowing through the fluid circuit B, causing the low-temperature and low-pressure liquid refrigerant or two-phase refrigerant to evaporate. On the other hand, in the case in which the second heat exchanger 2b acts as a condenser, in the second heat exchanger 2b, heat is exchanged between the high-temperature and high-pressure refrigerant discharged from the compressor 5 and the fluid flowing through the fluid circuit B, causing the high-temperature and high-pressure gas refrigerant to condense.

The second heat exchanger 2b may be configured as a plate heat exchanger or a double-pipe heat exchanger, for example.

The refrigerant caused to circulate through the refrigerant circuit A may be carbon dioxide, for example. However, the refrigerant caused to circulate through the refrigerant circuit A is not limited to carbon dioxide. For example, the combustible refrigerant R32, other combustible refrigerants (for example, R290), a natural refrigerant such as hydrocarbon or helium, and R410A obviously may be adopted, as well as non-chlorine-containing refrigerants like replacement refrigerants such as R4070 and R404A.

(Fluid Circuit B)

The fluid circuit B is configured by connecting a first pump 8a, a three-way valve 12, an AHU 10, and the fluid flow channel of the second heat exchanger 2b by fluid pipes 16. By causing the fluid to circulate through the fluid circuit B, in the air-conditioning apparatus 100, it becomes possible for heat stored in refrigerant in the refrigerant circuit A to be transmitted to the fluid circuit B through the second heat exchanger 2b.

The first pump 8a is utilized to transport the fluid in the fluid circuit B.

The three-way valve 12 switches the flows of fluid. In other words, the three-way valve 12 is used to switch whether the fluid passes through the second branch circuit D or not.

The second heat exchanger 2b is as described earlier.

The AHU 10 is a load device that heats or cools an air-conditioned space 150 such as an indoor space, while also replacing outdoor air. The AHU 10 is installed inside a structure such as an office, a building, a commercial facility, and a factory.

The AHU 10 has a configuration enabling outdoor air (OA) to be supplied to the air-conditioned space 150 as supply air (SA). Also, the AHU 10 has a configuration enabling return air (indoor air, RA) to be supplied to the air-conditioned space 150 as supply air (SA). Specifically, an air duct 19 is connected to the AHU 10, outdoor air (OA) and return air (RA) are able to be introduced through the air duct 19 in any ratio, and heat-exchanged air is supplied to the air-conditioned space 150 as supply air (SA). Note that the any ratio of outdoor air (OA) and return air (RA) also includes 0:100(%).

In other words, the AHU 10 at least includes a water-air heat exchanger that exchanges heat between the fluid flowing through the fluid circuit B and the outdoor air (OA) or the return air (RA), and a fan that supplies the outdoor air (OA) or the return air (RA) to the heat exchanger.

Note that the AHU 10 may also have a configuration capable of exhausting return air (indoor air, RA) outdoors as exhaust air (EA).

Also, the fluid heat-exchanged by the second heat exchanger 2b is not necessarily supplied to the AHU 10 directly. For example, a configuration is possible in which a different water-water heat exchanger is additionally provided upstream of the AHU 10, and fluid is supplied to the AHU 10 after the fluid is caused to pass through the water-water heat exchanger.

The fluid caused to circulate through the fluid circuit B may be water, for example. However, the fluid caused to circulate through the fluid circuit B is not limited to water. For example, brine, a mixture of brine and water, or a similar fluid may also be adopted.

(First Branch Circuit C)

The first branch circuit C connects a branching portion c1 at which a downstream portion of the second heat exchanger 2b branches and a connecting portion c2 farther downstream in the direction of fluid flow than the branching portion c1. Specifically, the first branch circuit C is configured to branch off from the downstream portion of the second heat exchanger 2b of the fluid circuit B, and connect to an upstream portion of the first pump 8a.

The first branch circuit C is configured by connecting a solenoid valve 11 and a third heat exchanger 7 by a first branch pipe 17.

The solenoid valve 11 opens and closes the first branch pipe 17 to allow or not allow the flow of fluid to the first branch circuit C.

The third heat exchanger 7 is provided on a downstream portion of the solenoid valve 11, and acts as a water-air heat exchanger that exchanges heat between fluid flowing through the first branch circuit C and air (outdoor air) supplied by a second fan 1b. By installing the third heat exchanger 7, in the air-conditioning apparatus 100, it is possible to introduce and utilize outdoor air.

The third heat exchanger 7 may be configured as a fin and tube heat exchanger, for example. Note that the third heat exchanger 7 may also be provided at an upstream portion of the solenoid valve 11.

The driving of the second fan 1b is controlled to supply air (outdoor air) to the third heat exchanger 7.

(Second Branch Circuit D)

The second branch circuit D connects a branching portion d1 at which a portion farther downstream than the connecting portion c2 of the first branch circuit C branches and a connecting portion d2 farther downstream in the direction of fluid flow than the branching portion d1. Specifically, the second branch circuit D is configured to branch off from the downstream portion of the first pump 8a of the fluid circuit B, and connect to an upstream portion of the AHU 10.

The second branch circuit D is connected by the three-way valve 12, a heat storage tank 9, and a second pump 8b by a second branch pipe 18.

The three-way valve 12 is as described earlier.

The heat storage tank 9 stores fluid having passed through the second branch circuit D. The capacity of the heat storage tank 9 is not particularly limited, and it is sufficient to store enough fluid to be used in operation during the heat storage tank water supplying operation described later. Also, insulating material preferably is installed around the heat storage tank 9.

Note that although the configuration of the heat storage tank 9 is not particularly limited, as illustrated in FIGS. 1 and 2, a part of the second branch pipe 18 that is upstream of the heat storage tank 9 preferably connects to an upper portion of the heat storage tank 9, while a part of the second branch pipe 18 that is downstream of the heat storage tank 9 preferably connects to a lower portion of the heat storage tank 9.

The second pump 8b is used to transport the fluid in the second branch circuit D.

Also, the air-conditioning apparatus 100 includes a heat source unit 110 and a tank unit 120.

The heat source unit 110 is equipped with the refrigerant circuit A and a part of the fluid circuit B including the first branch circuit C.

The tank unit 120 is equipped with another part of the fluid circuit B including the second branch circuit D.

The heat source unit 110 and the tank unit 120 are connected through the fluid pipes 16.

Note that the tank unit 120 does not necessarily have to be provided.

The "heat source unit 110" corresponds to a "first unit" of the present invention.

Also, the air-conditioning apparatus 100 is provided with a control device 50 that controls the air-conditioning apparatus 100 as a whole. Herein, a case in which the control device 50 is provided in the heat source unit 110 is illustrated as an example.

The control device 50 controls the operation of each actuator (driving component) included in the air-conditioning apparatus 100. Examples of actuators include the compressor 5, the flow switching device 6, the expansion device 4, the first fan 1a, the second fan 1b, the first pump 8a, the second pump 8b, the solenoid valve 11, and the three-way valve 12. In other words, the control device 50 includes functions such as that of the compressor frequency adjustment unit.

Note that typically, the AHU 10 is equipped with an AHU control device. Additionally, an actuator of the AHU 10 is controlled by communication between the control device 50 provided in the heat source unit 110 and the AHU control device provided in the AHU 10. However, herein, the control device 50 is described as also including the functions of the AHU control device for convenience of explanation.

The control device 50 may be configured by hardware such as a circuit device that performs the functions of the control device 50, and may also be configured by a computational device such as a microcontroller and a CPU, and software performed on the computational device.

<Operations of Air-Conditioning Apparatus 100>

Here, operations of the air-conditioning apparatus 100 will be described. The air-conditioning apparatus 100 is capable of performing normal operation, cooling storage operation, and heat storage tank water supplying operation. Normal operation refers to operation that causes refrigerant to circulate through the refrigerant circuit A, causes fluid to circulate through the fluid circuit B without causing fluid to circulate through the first branch circuit C and the second branch circuit D, and supplies fluid heat-exchanged in the second heat exchanger 2b to the AHU 10. Cooling storage operation refers to operation that stores fluid heat-exchanged in the third heat exchanger 7 in the heat storage tank 9, without causing refrigerant to circulate through the refrigerant circuit A. The heat storage tank water supplying operation refers to operation that supplies fluid stored in the heat storage tank 9 to the AHU 10.

(Normal Operation)

Figure 3:
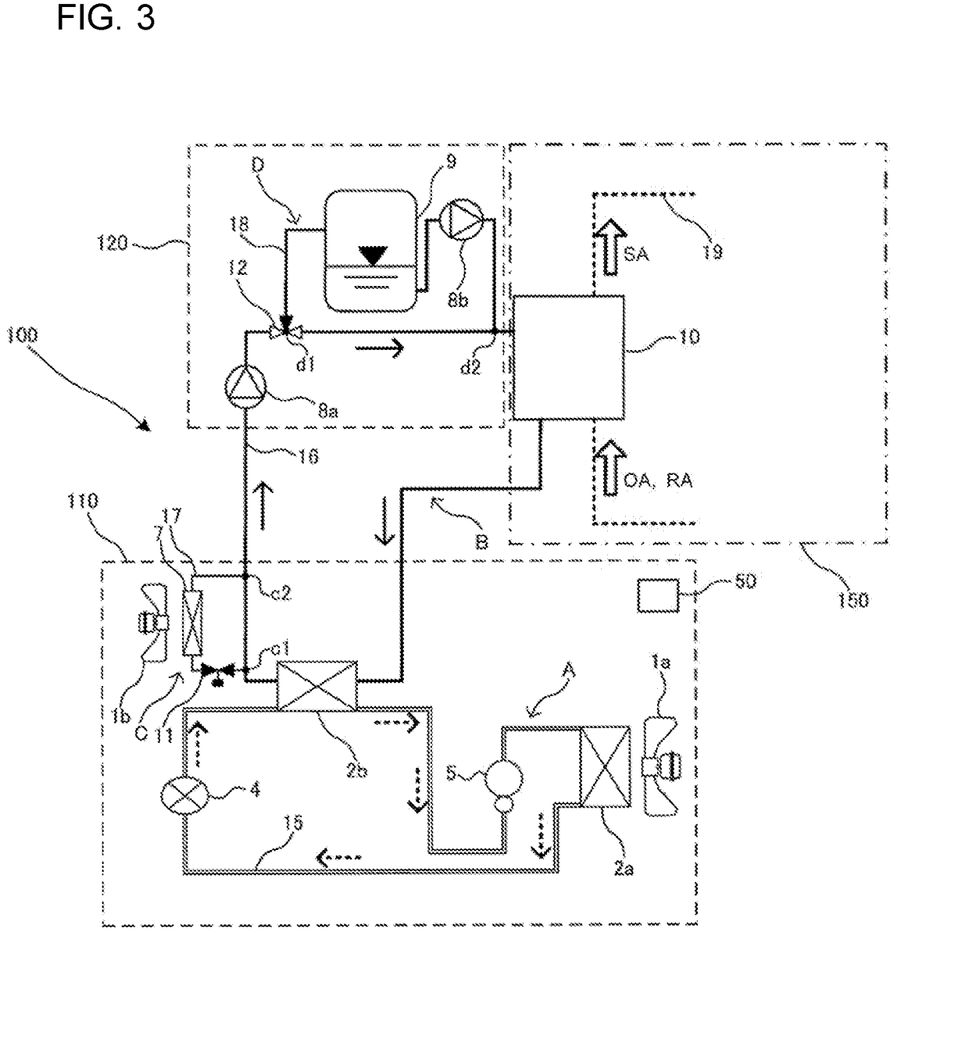
FIG. 3 is a schematic configuration diagram schematically illustrating the flows of refrigerant and fluid during normal operation of the air-conditioning apparatus according to Embodiment 1 of the present invention.

FIG. 3 is a schematic configuration diagram schematically illustrating the flows of refrigerant and fluid during normal operation of the air-conditioning apparatus 100. Normal operation of the air-conditioning apparatus 100 will be described with reference to FIG. 3. When normal operation is performed, the compressor 5 is driven, the first pump 8a is driven, the second pump 8b is stopped, and the AHU 10 is driven. Note that the solenoid valve 11 is closed, and is shaded black to illustrate this state. Also, the three-way valve 12 is set not to pass fluid to the second branch circuit D, and a part of the three-way valve 12 is shaded black to illustrate this state. Furthermore, in FIG. 3, a refrigerant circuit configuration not provided with the flow switching device 6 is illustrated.

First, the flow of refrigerant in the refrigerant circuit A during normal operation of the air-conditioning apparatus 100 will be described. Herein, the flow of refrigerant in the refrigerant circuit A in which the first heat exchanger 2a is caused to act as a condenser and the second heat exchanger 2b is caused to act as an evaporator will be described.

By driving the compressor 5, refrigerant is suctioned into the compressor 5. The compressor 5 compresses and discharges the suctioned refrigerant as refrigerant in a high-temperature and high-pressure gas state. The high-temperature and high-pressure gas refrigerant discharged from the compressor 5 flows into the first heat exchanger 2a. In the first heat exchanger 2a, heat is exchanged between the high-temperature and high-pressure gas refrigerant flowing into the first heat exchanger 2a and air supplied by the first fan 1a, causing the high-temperature and high-pressure gas refrigerant to condense and become high-pressure liquid refrigerant.

By the expansion device 4, the high-pressure liquid refrigerant sent out from the first heat exchanger 2a becomes two-phase refrigerant containing low-pressure gas refrigerant and liquid refrigerant. The two-phase refrigerant flows into the second heat exchanger 2b. In the second heat exchanger 2b, heat is exchanged between the two-phase refrigerant flowing into the second heat exchanger 2b and the fluid flowing through the fluid circuit B, and of the two-phase refrigerant, the liquid refrigerant evaporates to become low-pressure gas refrigerant. The low-pressure gas refrigerant sent out from the second heat exchanger 2b flows into the compressor 5, is compressed to become high-temperature and high-pressure gas refrigerant, and is discharged from the compressor 5 again. Subsequently, this cycle is repeated.

Next, the flow of fluid in the fluid circuit B during normal operation of the air-conditioning apparatus 100 will be described. During normal operation of the air-conditioning apparatus 100, the solenoid valve 11 is closed to cause fluid not to flow through the first branch circuit C. Also, during normal operation of the air-conditioning apparatus 100, the three-way valve 12 causes fluid not to flow into the second branch circuit D.

By driving the first pump 8a, fluid is circulated through the fluid circuit B. The fluid flowing into the second heat exchanger 2b is cooled by the refrigerant flowing into the second heat exchanger 2b. At this time, as the second heat exchanger 2b is acting as an evaporator, the refrigerant evaporates when cooling the fluid. The fluid cooled in the second heat exchanger 2b becomes cold water and is supplied to the tank unit 120.

As the three-way valve 12 is controlled in such a manner that fluid does not flow into the second branch circuit D in the tank unit 120, the cold water supplied to the tank unit 120 is supplied to the AHU 10 without passing through the second branch circuit D. In the AHU 10, cold water flowing through the fluid circuit B and air (outdoor air (OA), return air (RA), or a mixture of outdoor air (OA) and return air (RA)) exchange heat in the water-air heat exchanger provided in the AHU 10, and the air is cooled. The air is sent as supply air SA to the air-conditioned space 150.

(Cooling Storage Operation)

Figure 4:
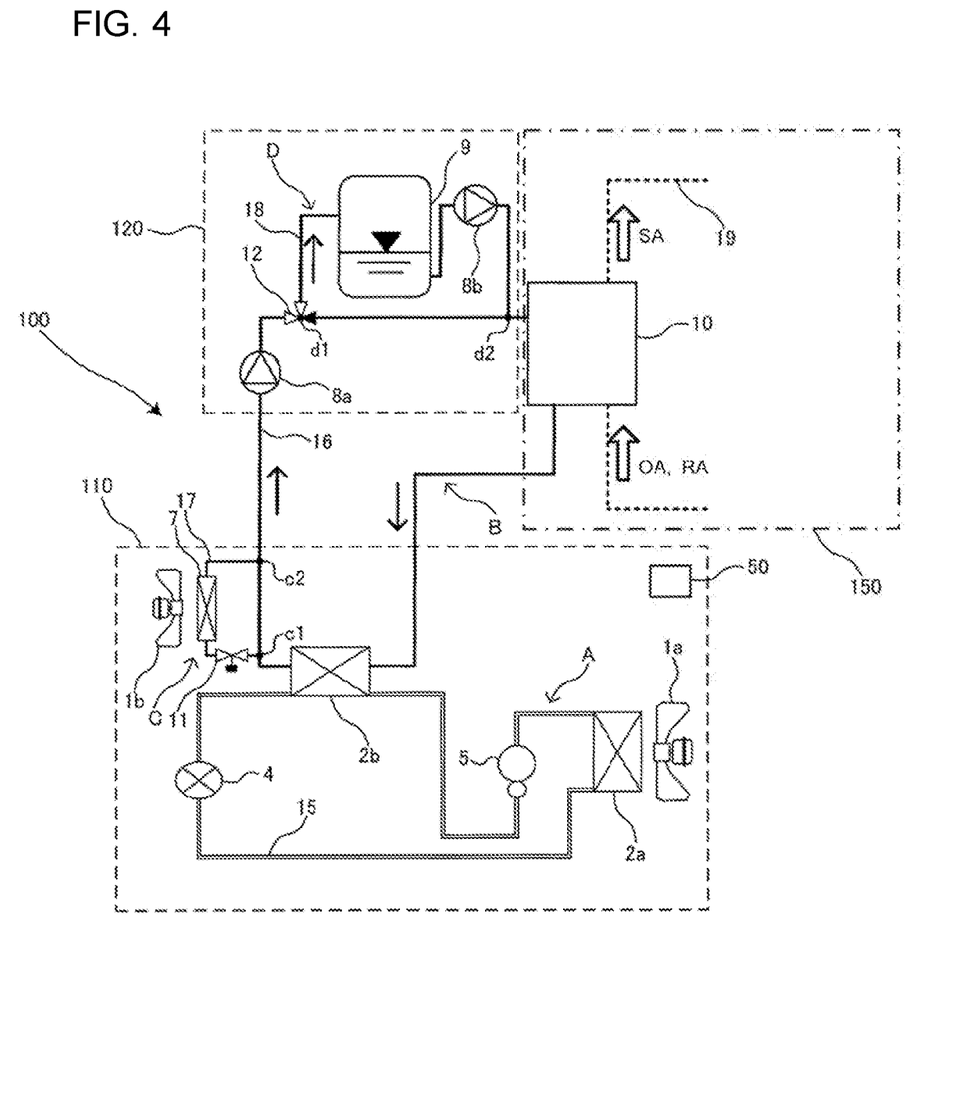
FIG. 4 is a schematic configuration diagram schematically illustrating the flow of fluid during cooling storage operation of the air-conditioning apparatus according to Embodiment 1 of the present invention.

FIG. 4 is a schematic configuration diagram schematically illustrating the flow of fluid during cooling storage operation of the air-conditioning apparatus 100. Cooling storage operation of the air-conditioning apparatus 100 will be described with reference to FIG. 4. When cooling storage operation is performed, the compressor 5 is stopped, the first pump 8a is driven, the second pump 8b is stopped, and the AHU 10 is stopped. Note that the solenoid valve 11 is opened, and is shaded white to illustrate this state. Also, the three-way valve 12 is set to pass fluid to the second branch circuit D, and a part of the three-way valve 12 is shaded black to illustrate this state. Furthermore, in FIG. 4, a refrigerant circuit configuration not provided with the flow switching device 6 is illustrated.

First, the flow of refrigerant in the refrigerant circuit A during cooling storage operation of the air-conditioning apparatus 100 will be described.

During cooling storage operation, the compressor 5 is stopped. In other words, refrigerant is not circulating through the refrigerant circuit A.

Next, the flow of fluid in the fluid circuit B during cooling storage operation of the air-conditioning apparatus 100 will be described. During cooling storage operation of the air-conditioning apparatus 100, the solenoid valve 11 is opened to cause fluid to flow through the first branch circuit C. Also, during cooling storage operation of the air-conditioning apparatus 100, the three-way valve 12 causes fluid to flow into the second branch circuit D.

By driving the first pump 8a, fluid is circulated through the fluid circuit B. The fluid flowing into the second heat exchanger 2b flows out from the second heat exchanger 2b without being cooled by refrigerant. The fluid flowing out from the second heat exchanger 2b flows through the first branch pipe 17 via the solenoid valve 11 and flows into the third heat exchanger 7. In the third heat exchanger 7, heat is exchanged between the fluid flowing into the third heat exchanger 7 and air supplied by the second fan 1b, and the fluid is cooled. The fluid cooled in the third heat exchanger 7 becomes cold water and is supplied to the tank unit 120.

In the tank unit 120, as the three-way valve 12 is controlled in such a manner that fluid flows into the second branch circuit D, the cold water supplied to the tank unit 120 flows through the second branch pipe 18 and is supplied to the heat storage tank 9. At this time, as the second pump 8b is stopped, the cold water supplied to the heat storage tank 9 is stored in the heat storage tank 9. Subsequently, cooling storage operation continues until the required amount of cooling water is stored in the heat storage tank 9.

(Heat Storage Tank Water Supplying Operation)

Figure 5:
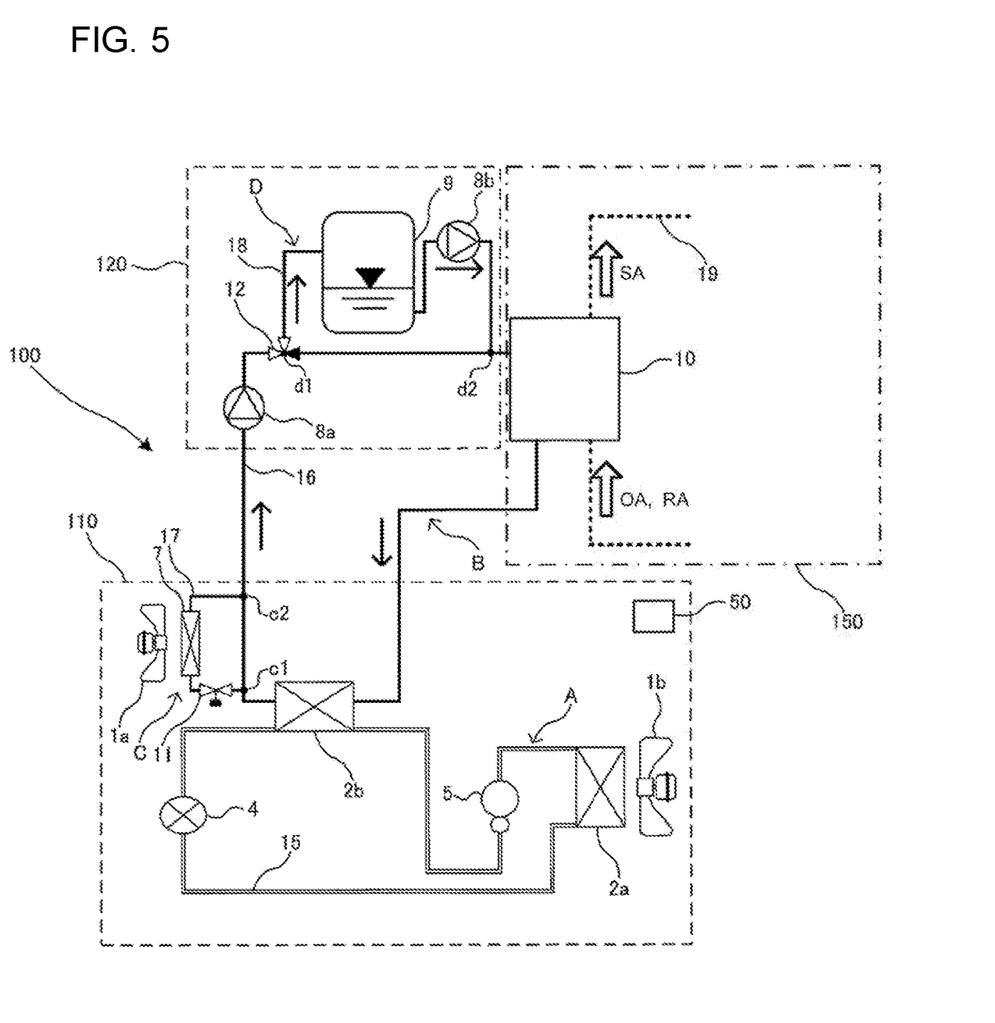
FIG. 5 is a schematic configuration diagram schematically illustrating the flow of fluid during heat storage tank water supplying operation of the air-conditioning apparatus according to Embodiment 1 of the present invention.

FIG. 5 is a schematic configuration diagram schematically illustrating the flow of fluid during heat storage tank water supplying operation of the air-conditioning apparatus 100. Heat storage tank water supplying operation of the air-conditioning apparatus 100 will be described with reference to FIG. 5. When heat storage tank water supplying operation is performed, the first pump 8a is driven, the second pump 8b is driven, and the AHU 10 is driven. Note that the solenoid valve 11 is opened, and is shaded white to illustrate this state. Also, the three-way valve 12 is set to pass fluid to the second branch circuit D, and a part of the three-way valve 12 is shaded black to illustrate this state. Furthermore, whether or not to circulate refrigerant through the refrigerant circuit A is determined depending on the temperature of the fluid returning to the heat source unit 110 from the AHU 10. In FIG. 5, a refrigerant circuit configuration not provided with the flow switching device 6 is illustrated.

The flow of fluid in the fluid circuit B during heat storage tank water supplying operation of the air-conditioning apparatus 100 will be described. During heat storage tank water supplying operation of the air-conditioning apparatus 100, the solenoid valve 11 is opened to cause fluid to flow through the first branch circuit C. Also, during heat storage tank water supplying operation of the air-conditioning apparatus 100, the three-way valve 12 causes fluid to flow into the second branch circuit D.

By driving the first pump 8a, fluid is circulated through the fluid circuit B. The fluid flowing into the second heat exchanger 2b flows out from the second heat exchanger 2b without being cooled by refrigerant. The fluid flowing out from the second heat exchanger 2b flows through the first branch pipe 17 via the solenoid valve 11 and flows into the third heat exchanger 7. In the third heat exchanger 7, heat is exchanged between the fluid flowing into the third heat exchanger 7 and air supplied by the second fan 1b, and the fluid is cooled. The fluid cooled in the third heat exchanger 7 becomes cold water and is supplied to the tank unit 120.

In the tank unit 120, as the three-way valve 12 is controlled in such a manner that fluid flows into the second branch circuit D, the cold water supplied to the tank unit 120 flows through the second branch pipe 18 and is supplied to the heat storage tank 9.

The cold water stored in the heat storage tank 9 flows out from the heat storage tank 9 by the second pump 8b, and is supplied to the AHU 10. In the AHU 10, cold water flowing through the fluid circuit B and air (outdoor air (OA), return air (RA), or a mixture of outdoor air (OA) and return air (RA)) exchange heat in the water-air heat exchanger provided in the AHU 10, and the air is cooled. The air is sent as supply air SA to the air-conditioned space 150.

At this point, in the air-conditioning apparatus 100, whether or not to circulate refrigerant through the refrigerant circuit A is determined depending on whether or not the temperature of fluid returning from the AHU 10 (hereinafter designated return water) exceeds a predetermined threshold value T1. Note that the threshold value T1 is a variable determined depending on the season, the indoor set temperature, and the load, and is changeable. The indoor set temperature refers to the set temperature of the air-conditioned space such as a room, and is set by a user via an input device such as a remote control.

In the case in which the temperature of the return water is higher than the threshold value T1, it may be determined that the air-conditioning load demanded for the air-conditioned space 150 is high. For this reason, as illustrated in FIG. 3, operation that causes the compressor 5 to operate, causes the solenoid valve 11 to close, and causes the second fan 1b to stop, or in other words, the same as normal operation is performed to cause refrigerant to circulate through the refrigerant circuit A.

On the other hand, in the case in which the temperature of the return water is equal to or lower than the threshold value T1, it may be determined that the air-conditioning load demanded for the air-conditioned space 150 is not so high. For this reason, as illustrated in FIG. 4, operation that causes the compressor 5 to stop, causes the solenoid valve 11 to open, and causes the second fan 1b to be driven, or in other words, the same as cooling storage operation is performed to cause refrigerant not to circulate through the refrigerant circuit A.

Figure 6:
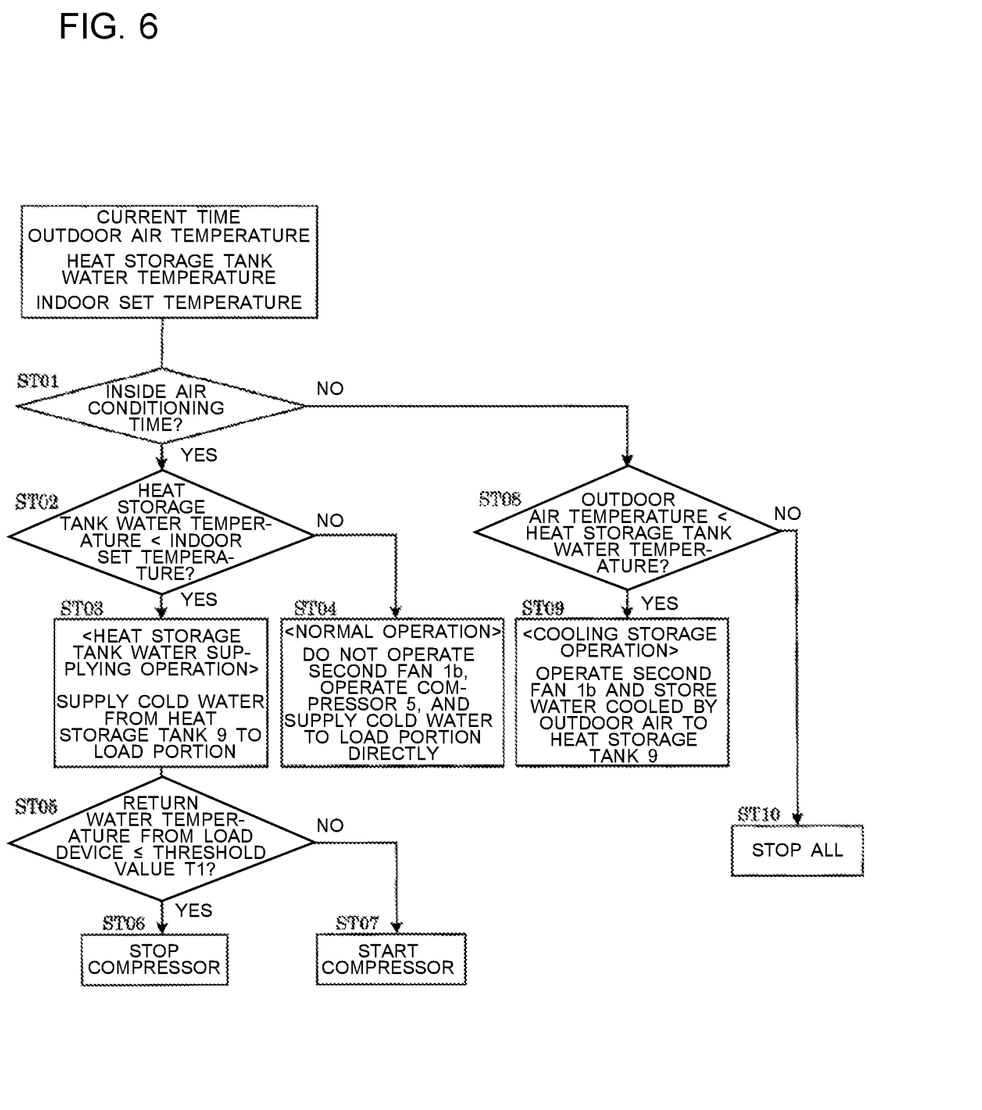
FIG. 6 is a flowchart illustrating the flow of a process to determine one of three operating states of the air-conditioning apparatus according to Embodiment 1 of the present invention.

Herein, the flow of a process to determine one of the three operating states of the air-conditioning apparatus 100 will be described. FIG. 6 is a flowchart illustrating the flow of a process to determine one of the three operating states of the air-conditioning apparatus 100.

The control device 50 obtains the current time, the outdoor air temperature, the heat storage tank water temperature, and the indoor set temperature. The control device 50 obtains the current time from a built-in timer, for example. Also, the control device 50 obtains the outdoor air temperature from an outdoor air temperature sensor installed in the heat source unit 110, for example. The control device 50 obtains the heat storage tank water temperature from a temperature sensor installed in the heat storage tank 9, for example. The control device 50 obtains the indoor set temperature from the settings by the user via an input device such as a remote control, for example.

In step ST01, the control device 50 determines whether or not the obtained current time is inside an air-conditioning time. Here, the air-conditioning time is the time when operation of the air-conditioning apparatus 100 is required, and is a time determined by the user. Specifically, a time period when the user is present inside the room and air-conditioning is required, such as from 9:00 a.m. to 7:00 p.m. for example, is the air-conditioning time.

When the current time is inside the air-conditioning time (step ST01, YES), in step ST02 the control device 50 determines whether or not the heat storage tank water temperature is lower than the indoor set temperature.

When the heat storage tank water temperature is lower than the indoor set temperature (step ST02, YES), the control device 50 starts heat storage tank water supplying operation (step ST03).

On the other hand, when the heat storage tank water temperature is equal to or higher than the indoor set temperature (step ST02, NO), the control device 50 starts normal operation (step ST04).

After heat storage tank water supplying operation is started, in step ST05 the control device 50 compares the relative magnitudes of the temperature of the return water from the load device and the threshold value T1.

In the case in which the return water temperature is equal to or lower than the threshold value T1 (step ST05, YES), the control device 50 stops the compressor 5 to cause an operating state similar to cooling storage operation (step ST06).

On the other hand, in the case in which the return water temperature is higher than the threshold value T1 (step ST05, NO), the control device 50 causes the compressor 5 to operate to cause the same operating state as normal operation (step ST07). At this time, the refrigeration capacity available in the refrigerant circuit A is variably adjusted by the compressor 5 and the first pump 8a depending on the difference between the return water temperature and the threshold value T1.

In step ST01, in the case in which the current time is outside the air-conditioning time (step ST01, NO), the control device 50 compares the relative magnitudes of the outdoor air temperature and the heat storage tank water temperature (step ST08).

In the case in which the outdoor air temperature is lower than the heat storage tank water temperature (step ST08, YES), the control device 50 starts cooling storage operation (step ST09).

On the other hand, in the case in which the outdoor air temperature is equal to or higher than the heat storage tank water temperature (step ST08, NO), the control device 50 stops the operation of all devices (step ST10).

After the control device 50 determines the operating state, the control device 50 performs the determination on the basis of the flowchart again after a fixed amount of time elapses, and determines the operating state again.

In this manner, in the air-conditioning apparatus 100, in cooling storage operation outside the air-conditioning time, fluid cooled by low-temperature outdoor air in the third heat exchanger 7 is stored in the heat storage tank 9. For this reason, in the air-conditioning apparatus 100, in heat storage tank water supplying operation performed inside the air-conditioning time, the cold water stored in the heat storage tank 9 may be used to obtain an outdoor air cooling effect.

Also, by performing cooling storage operation outside the air-conditioning time, the air-conditioning apparatus 100 is able to obtain an effect of lengthening the outdoor air cooling period even without performing air-conditioning operation 24 hours a day. For this reason, as the outdoor air cooling period may be lengthened, it becomes possible to reduce energy consumption.

Also, as the air-conditioning apparatus 100 is provided with the AHU 10, outdoor air OA may be introduced into the AHU 10 directly, and existing outdoor air cooling by the direct introduction of outdoor air may also be used.

<Modification of Air-Conditioning Apparatus 100>

Figure 7:
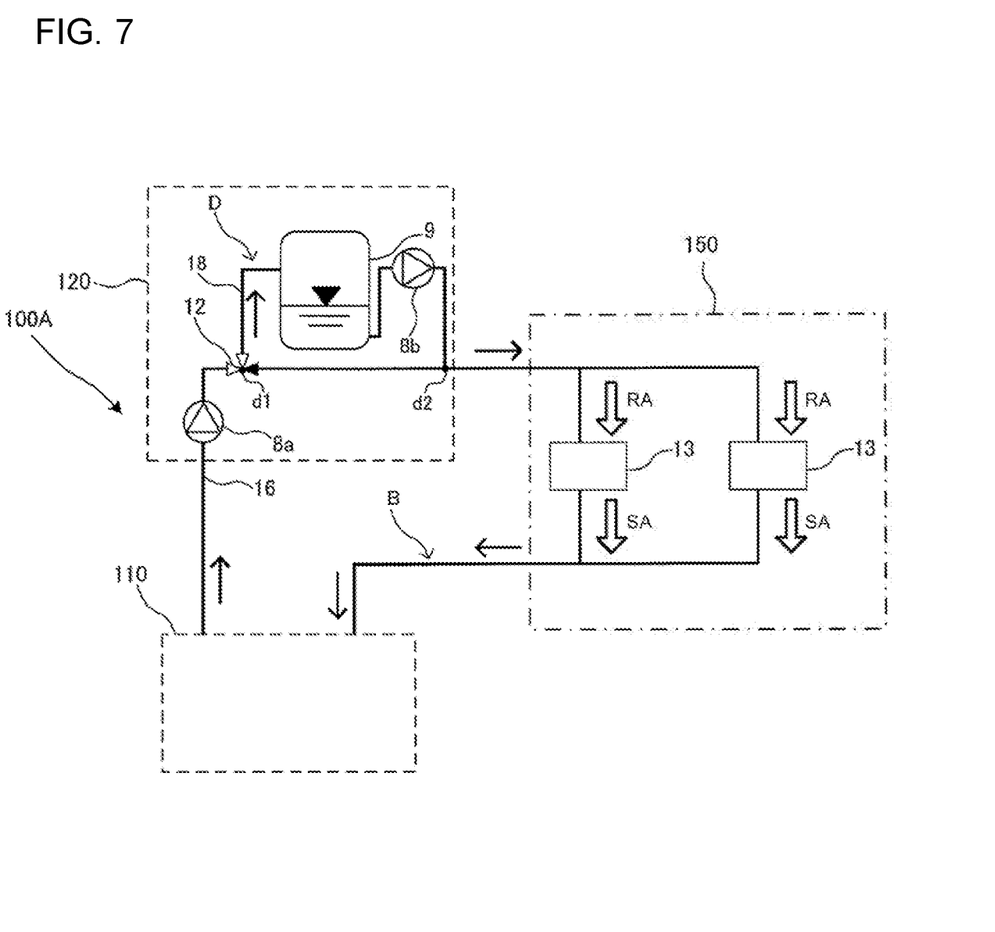
FIG. 7 is a schematic configuration diagram illustrating one example of a refrigerant circuit configuration of a modification of the air-conditioning apparatus according to Embodiment 1 of the present invention.

FIG. 7 is a schematic configuration diagram illustrating one example of a refrigerant circuit configuration of a modification (hereinafter designated the air-conditioning apparatus 100A) of the air-conditioning apparatus 100 according to Embodiment 1 of the present invention. The air-conditioning apparatus 100A will be described with reference to FIG. 7. Note that in FIG. 7, the flow of water in a water circuit is denoted with solid-line arrows, and the flow of air is denoted with outlined arrows.

In the air-conditioning apparatus 100, the AHU 10 is connected as the load device, but in the air-conditioning apparatus 100A, an FCU 13 rather than the AHU 10 is connected as the load device. An FCU typically is unable to introduce outdoor air. For this reason, in a system in which only an FCU is installed, typically it is not possible to perform outdoor air cooling.

In contrast, in the air-conditioning apparatus 100A, as low-temperature outdoor air may be used via the third heat exchanger 7, an outdoor air cooling effect is obtained.

In this manner, in the air-conditioning apparatus 100A, similarly to the air-conditioning apparatus 100, by performing cooling storage operation outside the air-conditioning time and performing heat storage tank water supplying operation inside the air-conditioning time, cold water stored in the heat storage tank 9 may be used to obtain an outdoor air cooling effect.

Also, the air-conditioning apparatus 100A is provided with the FCU 13, which is unable to introduce outdoor air, but as heat is exchanged between outdoor air and fluid in the third heat exchanger 7, it becomes possible to achieve indirect outdoor air cooling. For this reason, with the air-conditioning apparatus 100A, it becomes possible to reduce energy consumption.

Note that in the air-conditioning apparatus 100 and the air-conditioning apparatus 100A, a case in which the first heat exchanger 2a is caused to act as a condenser and cold water is stored in the heat storage tank 9 is described as an example, but the first heat exchanger 2a may also be caused to act as an evaporator and warm water may be stored in the heat storage tank 9. Even in this case, an effect similar to the case of storing cold water in the heat storage tank 9 is obtained.

Embodiment 2

Figure 8:
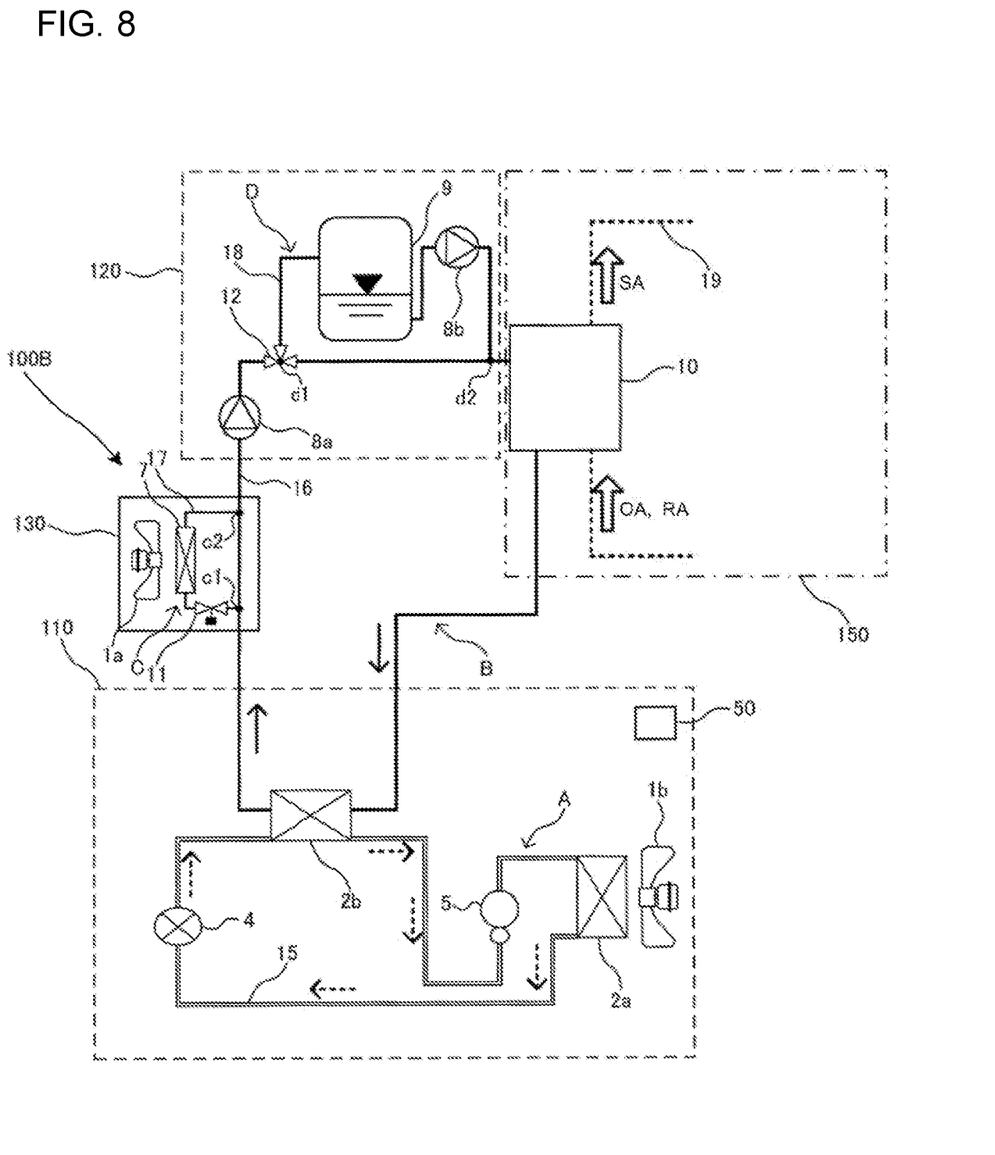
FIG. 8 is a schematic configuration diagram illustrating one example of a refrigerant circuit configuration of the air-conditioning apparatus according to Embodiment 2 of the present invention.

FIG. 8 is a schematic configuration diagram illustrating one example of a refrigerant circuit configuration of an air-conditioning apparatus 100B according to Embodiment 2 of the present invention. The air-conditioning apparatus 100b will be described with reference to FIG. 8. Note that in Embodiment 2, the differences from Embodiment 1 will be described mainly, portions that are the same as those of Embodiment 1 will be denoted with the same signs, and description of such portions will be omitted.

In the air-conditioning apparatus 100, an example in which the third heat exchanger 7, the solenoid valve 11, the second fan 1b, and the first branch pipe 17 are provided in the heat source unit 110 is illustrated, but in the air-conditioning apparatus 100B, the third heat exchanger 7, the solenoid valve 11, the second fan 1b, and the first branch pipe 17 are provided in an outdoor air introduction unit 130 separate and independent from the heat source unit 110 and the tank unit 120.

The "heat source unit 110" corresponds to a "first unit" of the present invention.

The "outdoor air introduction unit 130" corresponds to a "second unit" of the present invention.

Consequently, in the air-conditioning apparatus 100B, as the third heat exchanger 7, the solenoid valve 11, the second fan 1b, and the first branch pipe 17 are provided in the outdoor air introduction unit 130, the outdoor air introduction unit 130 may be additionally installed later, thereby improving functional expandability.

In this manner, in the air-conditioning apparatus 100B, the third heat exchanger 7, the solenoid valve 11, the second fan 1b, and the first branch pipe 17 are provided in the outdoor air introduction unit 130. For this reason, with the air-conditioning apparatus 100B, maintenance work on the third heat exchanger 7 may be performed more easily. Additionally, it also becomes possible to carry out work such as additional installation and replacement of the third heat exchanger 7 even more easily.

<Effects Obtained by Air-Conditioning Apparatus 100 (Including Air-Conditioning Apparatus 100A and Air-Conditioning Apparatus 100B)>

In the air-conditioning apparatus 100, the third heat exchanger 7 that exchanges heat between the fluid flowing through the fluid circuit B and outdoor air is provided in the first branch circuit C, and the heat storage tank 9 that stores fluid flowing through the fluid circuit B is provided in the second branch circuit D. For this reason, with the air-conditioning apparatus 100, fluid having exchanged heat with outdoor air by the third heat exchanger 7 may be stored in the heat storage tank 9, making it possible to perform operation utilizing the fluid stored in the heat storage tank 9. In other words, with the air-conditioning apparatus 100, by using the third heat exchanger 7 and the heat storage tank 9, a lengthening of the outdoor air air-conditioning period may be achieved irrespectively of presence of the operating time.

With the air-conditioning apparatus 100, as the third heat exchanger 7 is provided in the heat source unit 110, it is sufficient to provide the third heat exchanger 7, the first branch circuit C, the second fan 1b, and the solenoid valve 11 in the heat source unit 110. Consequently, the configuration does not lead to an increase in the size of the heat source unit 110, and as the configuration does not involve other components and increased complexity of the fluid circuit, the configuration also does not lead to an increase in cost.

With the air-conditioning apparatus 100, as the third heat exchanger 7 is provided in an outdoor air introduction unit, maintenance work, additional installation work, and replacement work become easy.

As the air-conditioning apparatus 100 is able to perform cooling storage operation outside the air-conditioning time, fluid cooled by outdoor air in the third heat exchanger 7 may be stored in the heat storage tank 9. For this reason, with the air-conditioning apparatus 100, in heat storage tank water supplying operation performed inside the air-conditioning time, the fluid stored in the heat storage tank 9 may be used to obtain an outdoor air cooling (outdoor air heating) effect.

In an operating state in which cold water having exchanged heat with outdoor air in the third heat exchanger 7 is stored in the heat storage tank 9, the air-conditioning apparatus 100 performs cooling storage operation when the outdoor air temperature is lower than the temperature of the fluid stored in the heat storage tank 9. For this reason, with the air-conditioning apparatus 100, as cooling storage operation may be performed in a time period outside the air-conditioning time when the outdoor air temperature is low, an effect of lengthening the outdoor air cooling period is obtained even without performing air-conditioning operation 24 hours a day, and energy consumption may be reduced.

In an operating state in which warm water having exchanged heat with outdoor air in the third heat exchanger 7 is stored in the heat storage tank 9, the air-conditioning apparatus 100 performs cooling storage operation when the outdoor air temperature is higher than the temperature of the fluid stored in the heat storage tank 9. For this reason, with the air-conditioning apparatus 100, as cooling storage operation may be performed in a time period outside the air-conditioning time when the outdoor air temperature is high, an effect of lengthening the outdoor air heating period is obtained even without performing air-conditioning operation 24 hours a day, and energy consumption may be reduced.

As the air-conditioning apparatus 100 is able to perform heat storage tank water supplying operation inside the air-conditioning time, fluid stored in the heat storage tank 9 during cooling storage operation may be supplied to the load device. For this reason, with the air-conditioning apparatus 100, in the load device, it becomes possible to perform air-conditioning operation using fluid stored in the heat storage tank 9, and energy consumption may be reduced.

In the state in which cold water having exchanged heat with outdoor air in the third heat exchanger 7 is stored in the heat storage tank 9, the air-conditioning apparatus 100 performs heat storage tank water supplying operation when the indoor set temperature is higher than the temperature of the fluid stored in the heat storage tank 9. For this reason, with the air-conditioning apparatus 100, as it becomes possible to perform cooling operation of the air-conditioned space 150 by heat storage tank water supplying operation depending on the indoor set temperature and the temperature of the fluid, an unwanted operating state may be avoided, and energy consumption may be reduced further.

In the state in which warm water having exchanged heat with outdoor air in the third heat exchanger 7 is stored in the heat storage tank 9, the air-conditioning apparatus 100 performs heat storage tank water supplying operation when the indoor set temperature is lower than the temperature of the fluid stored in the heat storage tank 9. For this reason, with the air-conditioning apparatus 100, as it becomes possible to perform cooling operation of the air-conditioned space 150 by heat storage tank water supplying operation depending on the indoor set temperature and the temperature of the fluid, an unwanted operating state may be avoided, and energy consumption may be reduced further.

Outside the air-conditioning time, the air-conditioning apparatus 100 performs cooling storage operation through comparison of the outdoor air temperature to the temperature of fluid stored in the heat storage tank 9, whereas inside the air-conditioning time, the air-conditioning apparatus 100 performs heat storage tank water supplying operation through comparison of the indoor set temperature to the temperature of fluid stored in the heat storage tank 9, and inside the air-conditioning time, the air-conditioning apparatus 100 performs normal operation when the indoor set temperature is equal to or lower than the temperature of the fluid stored in the heat storage tank 9. For this reason, with the air-conditioning apparatus 100, by using the third heat exchanger 7 and the heat storage tank 9, a lengthening of the outdoor air air-conditioning period may be achieved irrespectively of presence of the operating time.

With the air-conditioning apparatus 100, as the flow switching device 6 is provided in the refrigerant circuit A, operation that heats the fluid in the third heat exchanger 7 may also be performed and warm water may be stored in the heat storage tank 9, making it possible to perform not only cooling operation but also heating operation in the load device.

Embodiments of the present invention are described separately as Embodiments 1 and 2, but the present invention is not limited to the content described in each embodiment, and may be modified appropriately within a scope that does not depart from the gist of the present invention. For example, Embodiments 1 and 2 cite an exemplary case in which the first pump 8*a* is provided in the tank unit 120 and the second pump 8*b* is provided in the tank unit 120, but both the first pump 8*a* and the second pump 8*b* may be provided in the heat source unit 110. Additionally, a three-way valve may also be used as a substitute for the solenoid valve 11. Additionally, a solenoid valve may be used as a substitute for the three-way valve 12.

The invention claimed is:

1. An air-conditioning apparatus, comprising:
a refrigerant circuit in which a compressor, a first heat exchanger, an expansion valve, and a second heat exchanger are connected by pipes, and through which refrigerant circulates; and
a fluid circuit through which fluid circulates, the fluid exchanging heat, in the second heat exchanger, with the refrigerant circulating through the refrigerant circuit,
the fluid circuit including
a first branch circuit that connects a branching portion and a connecting portion, wherein the branching portion branches from a conduit downstream of the second heat exchanger, and wherein the connecting portion is farther downstream in a direction of fluid flow than the branching portion, and
a second branch circuit that connects a branching portion and a connecting portion, wherein the branching portion connected to the second branch circuit branches at a portion farther downstream than the connecting portion connected to the first branch circuit, and wherein the connecting portion connected to the second branch circuit is farther downstream in the direction of fluid flow than the branching portion connected to the second branch circuit,
the first branch circuit being provided with a third heat exchanger that exchanges heat between fluid flowing through the fluid circuit and outdoor air,
the second branch circuit being provided with a heat storage tank that stores fluid having exchanged heat with outdoor air in the third heat exchanger.

2. The air-conditioning apparatus of claim 1, wherein the compressor, the first heat exchanger, the expansion valve, the second heat exchanger, the first branch circuit, and the third heat exchanger are provided in a first unit.

3. The air-conditioning apparatus of claim 1, wherein
the compressor, the first heat exchanger, the expansion valve, and the second heat exchanger are provided in a first unit, and
the first branch circuit and the third heat exchanger are provided in a second unit separate from the first unit.

4. The air-conditioning apparatus of claim 1, further comprising:
a control device configured to control a flow of refrigerant in the refrigerant circuit and a flow of fluid in the fluid circuit, wherein,
outside an air-conditioning time, the control device configured to perform a cooling storage operation that stops a circulation of refrigerant in the refrigerant circuit, causes fluid to flow through the first branch circuit and the second branch circuit, and stores, in the heat storage tank, fluid having exchanged heat with outdoor air in the third heat exchanger.

5. The air-conditioning apparatus of claim 4, wherein,
in a state in which fluid cooled in the third heat exchanger is stored in the heat storage tank,
the control device is configured to perform the cooling storage operation when an outdoor air temperature is lower than a temperature of the fluid stored in the heat storage tank.

6. The air-conditioning apparatus of claim 4, wherein,
in a state in which fluid heated in the third heat exchanger is stored in the heat storage tank,
the control device is configured to perform the cooling storage operation when an outdoor air temperature is higher than a temperature of the fluid stored in the heat storage tank.

7. The air-conditioning apparatus of claim 1, further comprising:
a control device configured to control a flow of refrigerant in the refrigerant circuit and a flow of fluid in the fluid circuit, wherein,
inside an air-conditioning time, the control device is configured to perform a heat storage tank water supplying operation that stops a circulation of refrigerant in the refrigerant circuit, causes fluid to flow through the first branch circuit and the second branch circuit, and supplies fluid stored in the heat storage tank to a load device.

8. The air-conditioning apparatus of claim 7, wherein,
in a state in which fluid cooled in the third heat exchanger is stored in the heat storage tank,
the control device is configured to perform the heat storage tank water supplying operation when a set temperature of an air-conditioned space provided with the load device is higher than a temperature of the fluid stored in the heat storage tank.

9. The air-conditioning apparatus of claim 7, wherein,
in a state in which fluid heated in the third heat exchanger is stored in the heat storage tank,
the control device is configured to perform the heat storage tank water supplying operation when a set temperature of an air-conditioned space provided with the load device is lower than a temperature of the fluid stored in the heat storage tank.

10. The air-conditioning apparatus of claim 1, further comprising:
a control device configured to control a flow of refrigerant in the refrigerant circuit and a flow of fluid in the fluid circuit, wherein,
outside an air-conditioning time, through comparison of an outdoor air temperature to a temperature of fluid stored in the heat storage tank, the control device performs a cooling storage operation that stops a circulation of refrigerant in the refrigerant circuit, causes fluid to flow through the first branch circuit and the second branch circuit, and stores, in the heat storage tank, fluid having exchanged heat with outdoor air in the third heat exchanger,
inside the air-conditioning time, through comparison of a set temperature of an air-conditioned space provided with a load device to the temperature of fluid stored in the heat storage tank, the control device performs a heat storage tank water supplying operation that stops the circulation of refrigerant in the refrigerant circuit, causes fluid to flow through the first branch circuit and the second branch circuit, and supplies fluid stored in the heat storage tank to the load device, and,
inside the air-conditioning time, when the set temperature of the air-conditioned space provided with the load device is equal to or lower than the temperature of fluid stored in the heat storage tank, the control device performs a normal operation that circulates refrigerant in the refrigerant circuit, causes fluid not to flow through the first branch circuit and the second branch circuit, and supplies fluid having exchanged heat in the refrigerant circuit to the load device.

11. The air-conditioning apparatus of claim 1, further comprising a flow switching device configured to switch flows of refrigerant in the refrigerant circuit.

* * * * *